United States Patent [19]
Prosan et al.
[11] Patent Number: 4,525,805
[45] Date of Patent: Jun. 25, 1985

[54] SECURE LOCKING SYSTEM EMPLOYING RADIANT ENERGY AND ELECTRICAL DATA TRANSMISSION

[76] Inventors: Richard Prosan, 9970 SW. 11 Ter., Miami, Fla. 33174; James M. Hair, III, P.O. Box 141, Moffett Field, Calif. 94035; Donald A. Sheppard, 9631 SW. 77th St., Miami, Fla. 33173

[21] Appl. No.: 451,345

[22] Filed: Dec. 20, 1982

[51] Int. Cl.[3] .................... G06F 9/00

[52] U.S. Cl. .................... 364/900

[58] Field of Search .................... 364/900, 200, 300; 235/380, 384, 381, 385, 382, 488, 493, 492, 491, 419, 431; 340/825.31, 825.34

[56] References Cited

U.S. PATENT DOCUMENTS

| | | | |
|---|---|---|---|
| Re. 29,259 | 6/1977 | Sabsay | 235/382.5 |
| 3,800,284 | 3/1974 | Zucker et al. | 340/825.31 |
| 3,851,314 | 11/1974 | Hedin | 340/825.31 |
| 3,906,447 | 9/1975 | Crafton | 340/825.31 |
| 3,911,397 | 10/1975 | Freeny, Jr. | 340/825.31 |
| 4,053,735 | 10/1977 | Foudos | 364/401 |
| 4,097,923 | 6/1978 | Eckert, Jr. | 364/900 |
| 4,157,534 | 6/1979 | Schachter | 340/825.31 |
| 4,319,131 | 3/1982 | McGeary et al. | 235/431 |
| 4,322,612 | 3/1982 | Lange | 235/431 |
| 4,367,402 | 1/1983 | Giraud et al. | 235/488 |
| 4,396,914 | 8/1983 | Aston | 235/382 |
| 4,442,345 | 4/1984 | Mollier et al. | 235/382.5 |
| 4,447,890 | 5/1984 | Duwel et al. | 364/900 |
| 4,453,074 | 6/1984 | Weinstein | 235/380 |

*Primary Examiner*—Gareth D. Shaw
*Assistant Examiner*—John G. Mills
*Attorney, Agent, or Firm*—Herman J. Hohauser

[57] ABSTRACT

An improved security system for use in mobile commerce consisting of an electromechanical lock and electronic key and an integrated program-erase procedure whereby overall systemic complexity and security are judiciously increased through the unequivocal implementation of a first electromagnetic wavelength irradiation to erase the volatile memories of the lock and/or key combined with the implementation of a second electromagnetic wavelength irradiation to program the volatile memories of the lock only.

8 Claims, 7 Drawing Figures

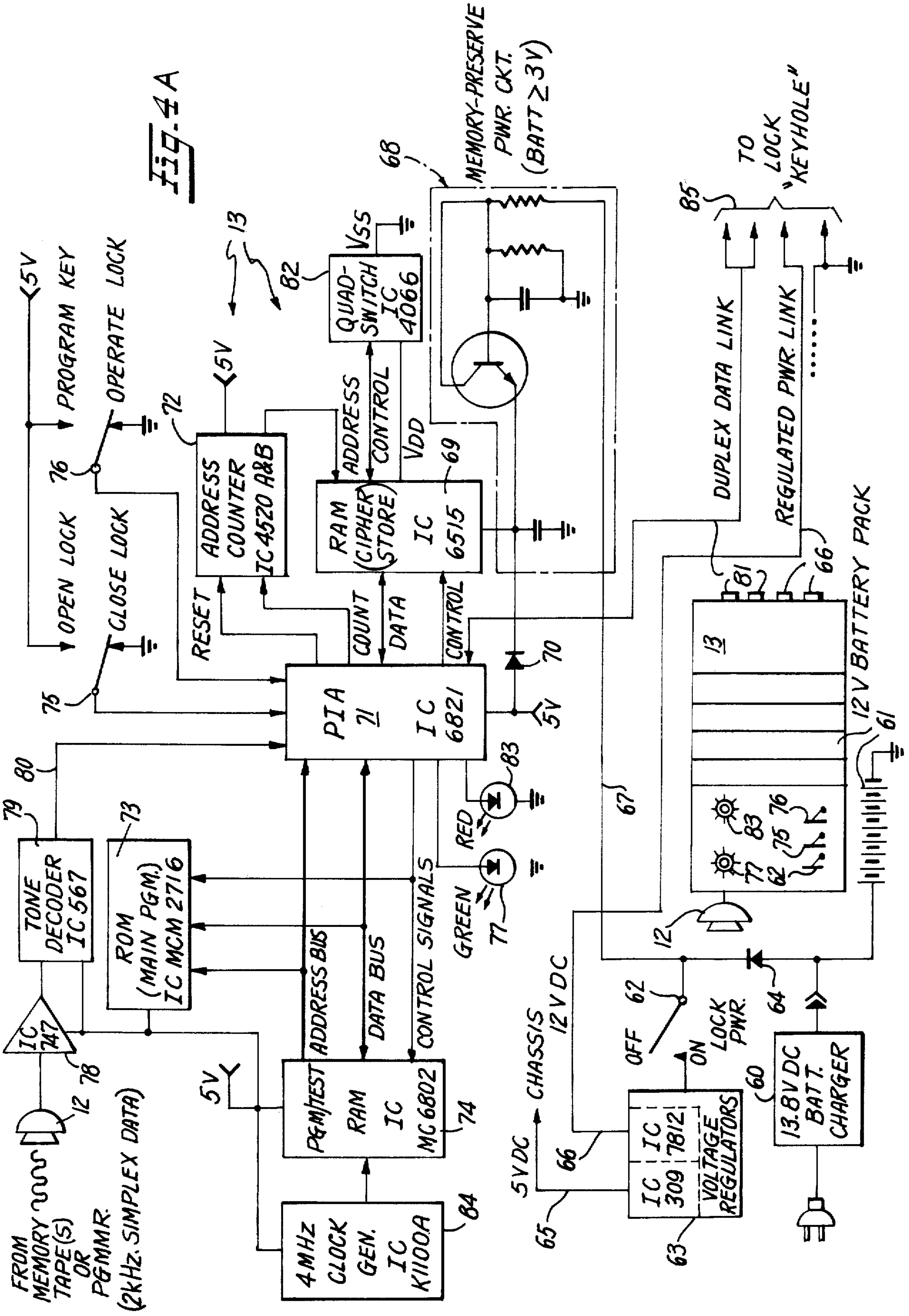
FIG. 4A
MEMORY-PRESERVE PWR. CKT. (BATT ≥ 3V)
TO LOCK "KEYHOLE"
DUPLEX DATA LINK
REGULATED PWR. LINK
12 V BATTERY PACK
QUAD-SWITCH IC 4066
VSS
VDD
ADDRESS
CONTROL
RAM (CIPHER STORE) IC 6515
ADDRESS COUNTER IC 4520 A&B
5V
PROGRAM KEY
OPERATE LOCK
OPEN LOCK
CLOSE LOCK
RESET
COUNT
DATA
PIA 21 IC 6821
TONE DECODER IC 567
ROM (MAIN PGM.) IC MCM 2716
ADDRESS BUS
DATA BUS
CONTROL SIGNALS
RED
GREEN
PGM/TEST RAM IC MC 6802
4 MHz CLOCK GEN. IC K1100A
IC 747
FROM MEMORY TAPE(S) OR PGMMR. (2kHz. SIMPLEX DATA)
CHASSIS 12 V DC
5 V DC
OFF
ON
LOCK PWR.
IC 309
IC 7812
VOLTAGE REGULATORS
13.8V DC BATT. CHARGER
12
13
60
61
62
63
64
65
66
67
68
69
70
72
73
74
75
76
77
78
79
80
81
82
83
84
85

SECURE LOCKING SYSTEM EMPLOYING RADIANT ENERGY AND ELECTRICAL DATA TRANSMISSION

BACKGROUND OF THE INVENTION

1. Field of the Invention

The security system proposed by this invention concerns the implementation of a motorized shackle/bolt-type lock and its mated handheld key(s), both of which are unequivocally programmable and erasable by means of an electronic computer for use in mobile commerce systems.

2. Description of the Prior Art

The notions of private property and the need for the protection thereof have initiated a long and somewhat torturous evolution through purely mechanical efforts to present-day electromechanical versions. The goal has been to improve the security of private property—(personal and industrial)—through the confusion and/or frustration of persons not having authorized access to such property. In recent times, the chief method of achieving this purpose has been to implement higher and higher orders of complexity of an electronic-control nature into portable keys and hardened mechanical locks, while still preserving sufficient simplicity to accommodate an authorized user. Some in the past have overemphasized this latter aspect of convenience with inventions relating to *keyless* security systems, such as U.S. Pat. Nos. 3,801,742 to O'Brien et al; 3,805,246 to Colucci et al.; 4,130,738 to Sandstedt; and 4,206,491 to Ligman et al. These represent honest and noble efforts directed to the access/storage of a digital code in various types of electronic memories contained in only the *locking* devices. It is readily apparent that the party for whom convenience is being optimized in these security systems is the person requiring immediate access to the locked contents (such as an inspector or receiver of goods). They are not designed to maximize the position of the party to whom shipped goods once belonged or to whom they may still belong (such as a freight shipper, manufacturer or freight company), and this fact is especially true of the stand-alone systems envisioned by the Colucci et al. and Ligman et al. patents.

Systems deployed along the lines of O'Brien et al. and Sandstedt probably go a bit too far in accommodating a shipper's convenience and security at the expense of complete loss of autonomy at the local receiver's end. These and other prior art keyless security systems, whether or not processor-based, do *not* provide for that first and fundamental obstacle to an unauthorized party; namely, the physical acquisition of a key-type device. Without the existence of a unique key both physically and electronically matched to the corresponding lock, an intruder is immediately free to improvise his own access means and is brought that much closer, temporally, to the successful violation of the security system.

There have been countless attempts of providing *keyed* security systems; however none of the known available systems offer unequivocal security in mobile commerce systems.

For example, some, such as U.S. Pat. Nos. 3,736,676 to Schachter et al., 3,800,284 to Zucker et al., and 4,257,030 to Bruhin et al., rely upon a high degree of dependence on purely mechanical relationships among their keys and locks, and thus they are quire subject to physical abuse, wear, and other damage. Additionally, none is easily adaptable to mobile interstate commerce systems because the locks of these systems are not portable. They are powered by a stationary AC source, and at best they would be self-powered only through the use of a clumsy integrated battery pack. This same problem of lack of portability of the critical locking device—and therefore the decreased applicability to widespread geographic dispersion—also plagues the security systems of other prior art systems such as U.S. Pat. Nos. 4,207,555 to Trombly, 4,189,712 to Lemelson, 3,944,976 to France, 3,845,361 to Watase, 3,821,704 to Sabsay, and 3,787,714 to Resnick.

Many of the prior art efforts have led to an overcompensation in the matter of local user autonomy divorced from the participation of the central facility. Specifically, arrangements such the systems of France, Trombly, Sabsay, and U.S. Pat. No. 3,859,634 to Perron et al. permit the easy alteration of the encoded memory of the locking device and/or key.

Several inventors, have complicated their security systems through the implementation of integrated-electromagnetic-radiation techniques. The systems of Resnick et al. and Lemelson require the active use of such single-wavelength techniques as a prominent matter of course in the *operation* of the lock-opening mechanism. The pursuit of matters along this particular direction leads to the unfortunate situation whereby a local user/-key holder is forced to have in his possession a device which cooperates with or generates the appropriate electromagnetic radiation. Such proliferation of this type of equipment in local hands virtually mandates a higher degree of sophistication and opportunity for unauthorized persons. Another use incorporating electromagnetic-radiation methods is found in Sanstedt who only addresses the *programming* aspects of locking devices.

As to the actual cooperation of the key and lock in everyday usage, it is important—as a matter of user convenience and time savings for the key holder—that neither the key nor the lock memories be completely disabled (erased) by a failed attempt to interface and mate the two as is the case as the system of U.S. Pat. No. 3,911,397 to Freeny, Jr. It is highly probable that one key located at a receiver's depot may be required to open a plurality of locks where nothing directed to the enhancement of security per se would be advanced by such a dire functional disablement due the by-chance mismatching of a uniquely encoded key and lock. At best, such a failure should result in the lock's not being opened; the key user should be free to make further attempts at other locks without having to implement a reprogramming procedure after each said failed attempt.

It is therefore the object of this invention to integrate many of the efforts in the prior technology relating to security systems by providing for a new security system and method which has the following characteristics:

(a) Widespread geographic adaptability for use within the interstate commerce system, especially among trucking lines and railroads;

(b) Versatility and portability of both keys and locks with the former being the operational power source for the latter;

(c) Encodable complex cipher memories for both keys and locks with the encoding of the latter possible only at a centralized factory;

(d) A key which is encodable at a centralized factory and reprogrammable repeatedly via remote telemetric means;

(e) An unambiguous programming-and-erasing scheme for at least the locking device whereby two completely different wavelengths of electromagnetic radiation are oppositely and respectively employed; and finally, (f) A system and procedure capable of programming a great number of keys and locks and further capable of storing such appropriate coding information in at least one centralized factory location on a complete basis (master) and in at least one other location on a partial basis (local subordinate).

BRIEF SUMMARY OF THE INVENTION

This invention is directed to a specific security system along with its programming and operating procedure in which a key and a lock can be mass produced and in which at least each lock has its volatile memory encoded with a complex cipher which must be similarly imparted to the key's homologous volatile memory circuits in order to effectuate a proper open-and-closed operation upon the successful interfacing of these two elements. The key-type device may be encoded with a cipher either at the centralized factory or remotely therefrom via telemetric means, but the locks may only be erased and (re)programmed at the centralized factory.

The specific procedure utilized for encoding the lock with its stored cipher code involves the use of electromagnetic radiation in one step—erasure—by which said radiation consists of a discrete wavelength such as ultraviolet light and which involves a second unequivocal step utilizing a second, separate discrete electromagnetic wavelength such as, infrared light to accomplish the actual programming of the cipher in the lock's memory circuits by electrical means employed concomitantly with said second-wavelength means.

The programming of the key, as well as its erasure, does *not* depend upon the use of any of the aforementioned irradiation procedures, although at least erasure of the memory circuits by a discrete electromagnetic wavelength is optional. Because the standard mode of programming and erasing this device is purely electrical, or even acoustical, in nature, it is not only possible to accomplish the encoding of a key with an appropriate lock's cipher at the centralized factory, but also remotely at a receiver's location via use of a telephone system or other telemetric means. The critical data stream, either at carrier or baseband level, is intended to be around 2 kHz.

The actual composition and format of the cipher code can consist of many different schemes. For example, the cipher can consist of a juxtaposition of an individual lock's case-stamped serial number, a randomly generated number derived from the home microprocessor at the central factory, and an arithmetical sum of all those digits in one appended figure. The resultant, serial number, randomly, or even quasirandomly generated sequence, and suffixed sum-of-its-digits provides one example of a cipher which may be easily and consistently implemented by this invention. Furthermore, a digital formating into eight-bit words may consist of seven bits of data carrying the substance of said cipher with the eighth bit being reserved for parity checking, particularly in asynchronous data systems. Thus, it is possible for the purpose of this invention to generate a given cipher and to verify its existence through a combined technique of parity-check and sum-of-the-digits matching correspondence, or "check-sum."

In standard operation, a lock is manufactured at a central factory where it is appropriately erased and programmed/verified with a cipher code as regards the lock's volatile memory circuits. Also provided are permanent memory circuits which control the overall operation and basic functional response and behavior of the motorized lock in "hard-wired" ROM-fashion. The lock contains no keyhole per se. Instead, it incorporates external contacts for receiving operational power and appropriate input data from either the master programmer at the factory or from a key in normal field usage. Internal to and protected by the lock's hardened casing is a suitable optical link whose aperture is only accessible when the motorized shackle/bolt of the lock is in the "open" position for conducting both infrared and ultraviolet light to the appropriate illumination and/or trigger positions within the internally, protected circuit areas of this device. Initial cipher-programming of a given lock activates "program safety" circuits (motor control) which initiate an open-shackle state cntinuing to the lock's final shipment from the factory.

A key is required to have encoded therein the appropriate cipher in order for it to enable that lock both to open and close. A failure of operation, or mismatch of key and lock, will erase neither the lock's volatile memory nor the key's but will instead enable the key holder either to utilize the same key on a different lock or to connect that key to an acoustic coupler in order to receive cipher-reprogramming via a telephonic/telemetric simplexed data link. Such data may come from the central factory which contains master memory tapes of all of the locks it has produced, or it may come from a remote shipping company/manufacturer of goods which possesses a magnetic tape containing the ciphers of all of the locks it has purchased or acquired.

It is possible that a particularly clever lock-picker may seek to utilize gamma rays or X-rays or random RF runs on the contacts of a lock in the hopes of getting it to open. If any of these efforts succeed in erasing either the permanent or the volatile memories of the lock, then this device will remain permanently disabled in the closed position, and it will have to be removed physically by destructive means.

BRIEF DESCRIPTION OF THE DRAWINGS

FIG. 4A is a schematic representation of a typical key utilized in this security system.

DESCRIPTION OF THE PREFERRED EMBODIMENT

Figure 1:
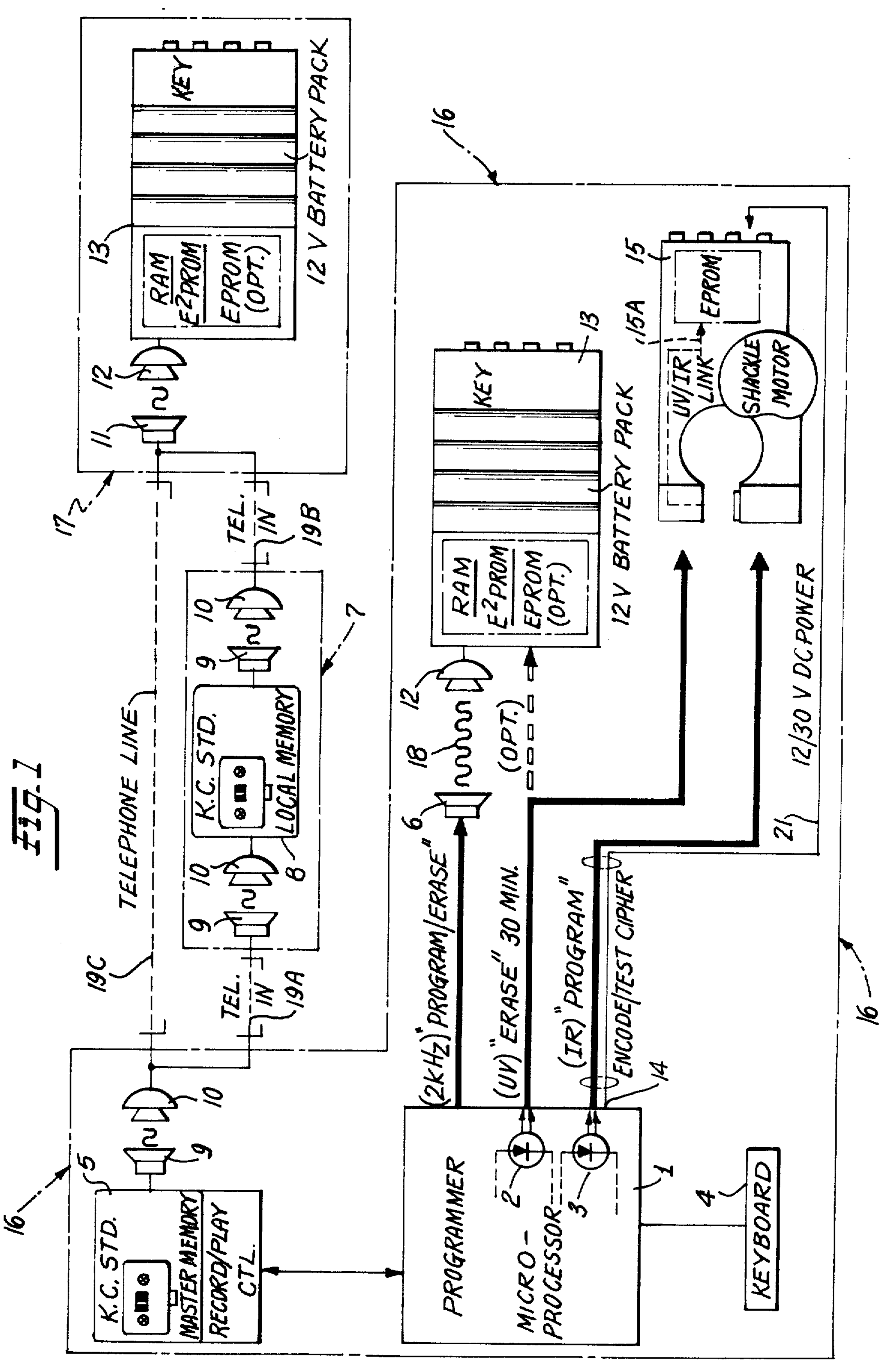
FIG. 1 is a semi-block-diagram of the overall security system of this invention.

In referring to the overall interrelationship of elements and procedures comprising this invention, FIG. 1 can be seen by one familiar to this field as the novel programming technique wherein a locking device 15 having a motor controlled shackle or bolt is programmed by an encoding microcomputer 1 at a processor location 16 colocated therewith, and by somewhat more versatile means, an opening device, or key 13, is programmed either at a location identical to the processor's location 16 or at a location 17 remote therefrom. The programmer 1 and all its peripheral equipment is to be installed at a central factory or processor location 16 where both keys 13 and locks 15 are manufactured; however, this is only a recommended arrangement intended to facilitate matters of the encoding of their respective volatile and permanent memories.

The improvement in overall security achievable with this unique programming method arises from the singularity and centrality of the programming location for the lock 15 as compared to the multiplicity of potential locations for the programming of key 13. The degree of control over sabotage and surprise "lock-outs" is significantly increased by this arrangement. A sufficient level of convenience is maintained by enabling the user of the key(s) to program/reprogram this device wherever there is access to a telephone and acoustic coupler 11 in accordance with a need to open a number of different locks. It should be clear however that the key user is not free to create his own codes remote from the processor location 16 which is another principal security feature of this system.

Still referring to FIG. 1, one can readily see that an unequivocal erase-and-program procedure is implemented by the exclusive dependence upon the selective use of invisible radiation, sources for which are not thought to be in the ready possession of thieves, saboteurs, and vandals or any discrete electromagnetic wave. Direct illumination of the semiconductor memories of the lock 15 (cipher and/or) main program) with ultraviolet light (UV) from a source 2 under the control of the programmer microprocessor erases these memories completely. The memories to be used are commercially available "erasable and (electrically) programmable read-only memories (eprom's)." Such a bulk erasing process normally takes anywhere from 20 to 30 minutes in order to attain satisfactory results. The actual methods of UV memory illumination include irradiation through an aperture in the superstructure (optical link 15A accessible only when the shackle or bolt is open) of the lock, removal and illumination of the discrete circuitry from lock casing, etc. Such an erasure scheme is optional but not recommended with the key 13 because of the added degree of complexity this would impose on remote erase-and-reprogram site locations 17 over and above the requirement for a simple telephone coupler 11.

Unequivocal and controlled programming for the lock 15 is accomplished only by the concomitant irradiation of its EPROM's via link 15A with infrared light (IR) under the control of a source 3 *and* the direct electrical connection of a metallic data link 14 and power link 21 between the programmer microprocessor 1 and the lock 15. Infrared radiation is chosen because such radiation is precisely on the opposite end of the visible spectrum as UV radiation, and results in a further assurance of unambiguous operation of the program and erase functions. Additional details regarding this mechanism may be gleaned from FIGS. 3A, 3B, and 3C.

Programming for the key 13 involves a separate procedure through a different medium being accomplished electrically through an acoustical link 18 between the programmer's transducer/coupler 6 (speaker) and the key's input transducer 12 (microphone). Both programming and erasure of the key's volatile memories (RAM's, $E^2$PROM's or EAROM's) may be accomplished over this acoustical link 18 which carries simplexed data from the programmer 1 at a carrier frequency around two kHz, which is comfortably within the voiceband of all telephone systems, and which may therefore be transmitted all over the world with a high degree of fidelity. While it is possible to erase (by factory option) the key's 13 volatile memories, if they are EPROM's, by the controlled use of the ultraviolet source 2, as indicated above the key 13 is not designed to respond to the IR light from element 3 thus making an unauthorized change in the locking system more difficult.

The programmer microprocessor 1 located at a suitable manufacturing or processor location 16 is manually addressed and controlled in the normal fashion by a suitable interface, such as a keyboard 4, and in addition to the large capacity read-only memory (ROM) intrinsic to this microprocessor 1, widely available in the general trade, it is contemplated that lock codes (ciphers) also be stored on an integrated master tape recorder 5 as a means of immediate memory back-up. In the preferred embodiment a Kansas City Standard format is used. The tapes made on recorder 5 are stored in a safe place at the central facility or processor location 16 and are used to error-check the programmer's internal semiconductor ROM as well as the volatile EPROM's of proximately located keys 13 and locks 15.

There is also a limited memory distribution plan intended for use with this security whereby user convenience and access to master locking codes (for (re)programming keys in remote locations) may be achieved. When an organization, such as a freight company located at a remote location 7 is supplied with a number of locks, it is desirable that such company has the means for providing its customers, freight recipients, and other valid key holders with the lock's cipher codes so that the keys may be expeditiously reprogrammed and the freight unloaded. To this end, a secondary tape and playback facility consisting of a simple cassette recorder 8 and acoustical coupler system 9 and 10 for telephone interfacing is recommended for each freight company or other customer at remote location 7 which ships locked cargo to plurl locations 17—and expects it to be unloaded. Such a local memory tape 8 may be either created at processor location 16 and shipped with a lock(s), or recorded over the telephone. It is important to note that regardless of the procedure, these local memory tapes 8 may only be generated by the programmer 1 and may be variously complete or incomplete as desired by the system's director at the home processor location 16 in accordance with the locks sold to a given freight company or other user.

Programming/encoding of a key 13 at the factory 16 should be straightforward at this point. It is physically accomplished through the direct hook-up of the key's input microphone 12 with the programmer's speaker/-coupler 6 in standard acoustic coupling format. Data (erase-and-cipher-encode) is then simplexed from coupler 6 into microphone 12. A similar technique is utilized at remote locations 17 where an authorized key holder may wish to program his unit 13 because of accidental erasure through tampering, a desire to use the key on another lock 15 also manufactured and programmed at processor location 16, a desire to encode a newly shipped key (blank memory) with a nascent lock code or a need to verify a key's code (repeat programming). Accordingly, the user may proceed in two different ways. He may dial-up the appropriate freight shipper, or local tape location 7 which contains the appropriate magnetic tape equipment 8, or he may access master tape code information by calling the programmer 1 operator at the factory or processor location 16. In either case, the transmission of the 2 kHz simplexed data stream through the various acoustic coupler arrangements 9, 10, 11, and 12 electrically erases and encodes the accessed lock cipher number if the key has been manufactured with a volatile memory consisting of an $E^2$PROM, RAM or EAROM. The implementation of an EPROM would be optional and would require that each remote location 17 have a data-stream-triggerable UV source 2 or some autonomous UV device. For further details relating to this mechanism, one should study FIGS. 4A and 4B.

Figure 2:
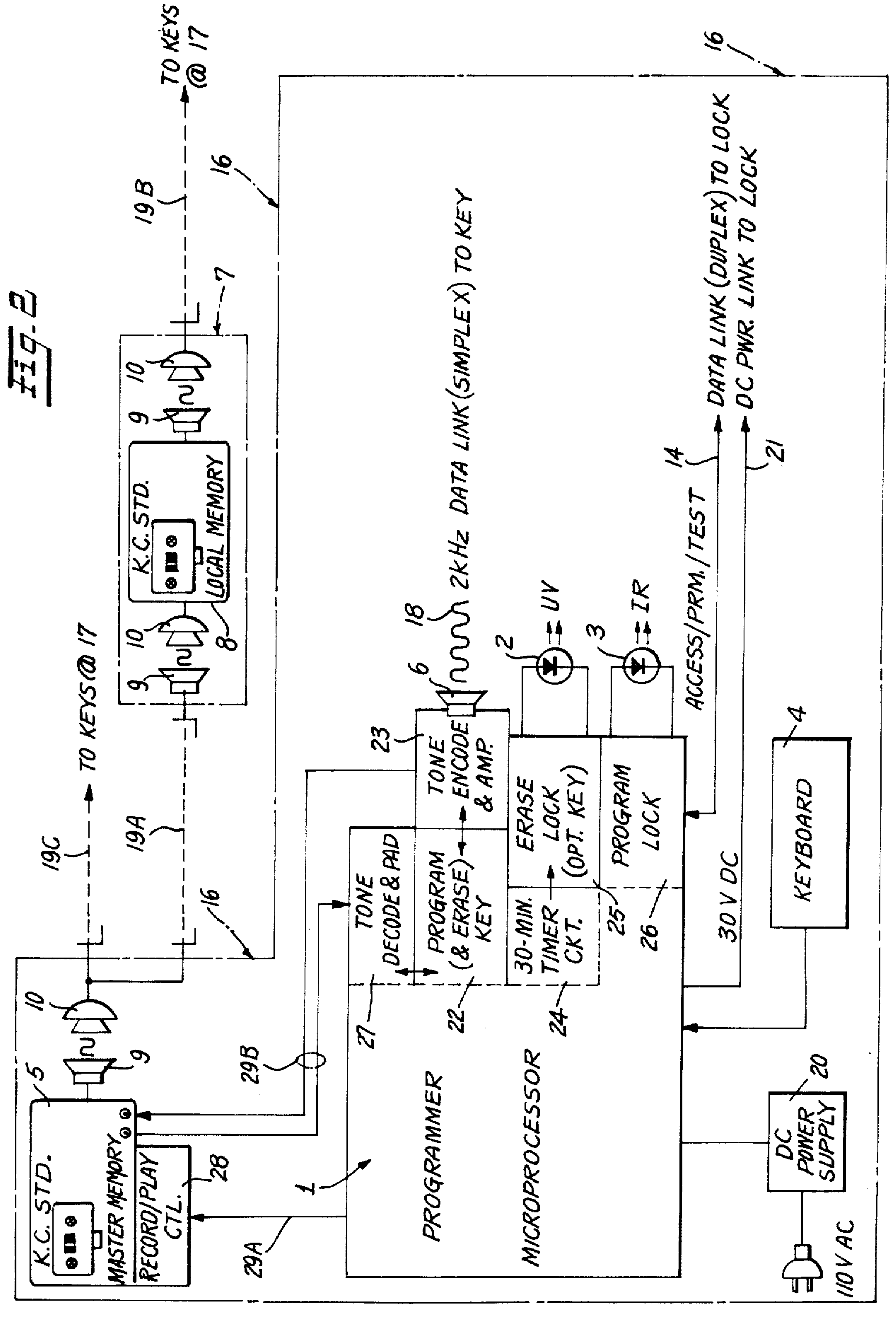
FIG. 2 is a functional representation of the central factory's master programmer and its interrelated peripherals.

Referring now to FIG. 2, microprocessor arrangement is shown having basic computing functions readily available in the general trade from such suppliers as IBM, DEC, etc. The microprocessor need only provide rudimentary algorithms, such as the generation of a random, or quasi-random, number. It must generate and recognize a parity bit for a byte of a given size (8 bits herein preferred) and must perform a simple calculation function known as "check-sum" which consists of the arithmetic addition of an input number and a randomly generated number. In the preferred embodiment the input number is the lock serial number. The microprocessor must be able to give general commands for controlling peripheral equipment, the most important of which are specifically illustrated in FIG. 2 and in other prior art similar layouts.

The programmer microprocessor 1 has a DC power supply 20 and a traditional input/control interface consisting of a keyboard 4 or its equivalent. There is an integrated master magnetic tape facility 5 which records and plays lock codes (ciphers) by the use of command link 29A and run circuits 28 under the direct control of the microprocessor 1. In the preferred embodiment a format known as the Kansas City Standard is used. Intercommunication between microprocessor 1 and master tape facility 5 consists of an electrical data link (metallic) 29B, as shown, between a tone encoder 23 and a tone decoder 27, or as will be understood by those skilled in the art consist of some other known and efficient communication methodmethods. There is also contemplated a telephonic data link 19 to a remote memory tape recorder 8 located at various shipping facilities or other remote locations 7 which functions essentially in a normal manner and which is intended to transmit autonomously its stored codes selectively to remote key locations 17 at subsequent times via similar transmission media, 19B, or via some other combination of long-distance communications technologies. As disclosed heretofore, the local memory tapes in recorder 8 contain a limited number of lock codes unique to a distinct need at remote user locations 17. The lock codes are selectively recorded into the tapes of remote recorder 8 by the programmer microprocessor 1 on a need-to-know basis. Accordingly, the set of memory tapes in recorder 8 is not a master memory set as are the tapes located at master tape facility 5 stored at the factory location(s) or processor location 16.

It is only necessary that the programmer microprocessor 1 contain sufficient memory to store lock cipher codes for all locks 15 to be encoded thereby. This memory may be of any sort—semiconductor, ferrite core, magnetic disc, or other known equivalent—and may be stored in either ROM or RAM-fashion. Functionally, in the preferred embodiment, the processor 1 must only generate lock ciphers, which consist of an individual lock's unique serial number appended to a random, or quasi-random, number and further appended to the actual arithmetical total sum-of-the-digits of that unique set number (check-sum), and must be able to generate and detect parity bits associated with the check-sum. A parity bit can be the eighth bit prefixed or suffixed to seven bits of data in an eight-bit word. The desultory nature of the lock cipher herein generated should be understood as enhancing overall systemic security, but it should also be understood that this system may function equally well using alternate and equivalent cipher-generating algorithms. Furthermore, the processor 1 needs to be able to transmit and verify its self-generated check-sums to an individual lock via suitable programming and interfacing circuits 26 and a duplex data link 14, which may or may not be a metallic electrical means as shown. Through this data link 14, a blank or erased individual lock's EPROM's are accessed, programmed, and tested through normal electronic programming mechanisms well understood by those skilled in the art. Concomitantly with the programming of a lock 15, the microprocessor 1 must also activate an infrared source, such as an LED 3 whose electromagnetic output must irradiate a suitable detector (phototransistor 40 in FIG. 3A), and it must also energize a DC power link 21 to enable a normally passive lock and place it in a responsive mode for unequivocal encoding/programming. To program a proximately located key 13, the microprocessor 1 must have the capability to impart an appropriate lock's cipher into said key through a suitable simplex data link 18 or 19C, which may or may not be acoustical as shown, originating in the necessary programming/interfacing circuitry 22 and an appropriately transducing stage, such as a tone encoder and amplifier 23 in conjunction with a coupling speaker 6 if necessary.

As alluded to above, the microprocessor 1, as a principal feature of this system, must be able to erase a given lock's EPROM's (and optionally, a key's EPROM's) by means of irradiation with ultraviolet light originating from a controlled source 2 for a period approaching 30 minutes in duration. This important function can be readily understood by those familiar with such matters to be accomplished through the use of a processor-integrated timer circuit 24 and (erase) control/interfacing circuit 25.

Figure 3A:
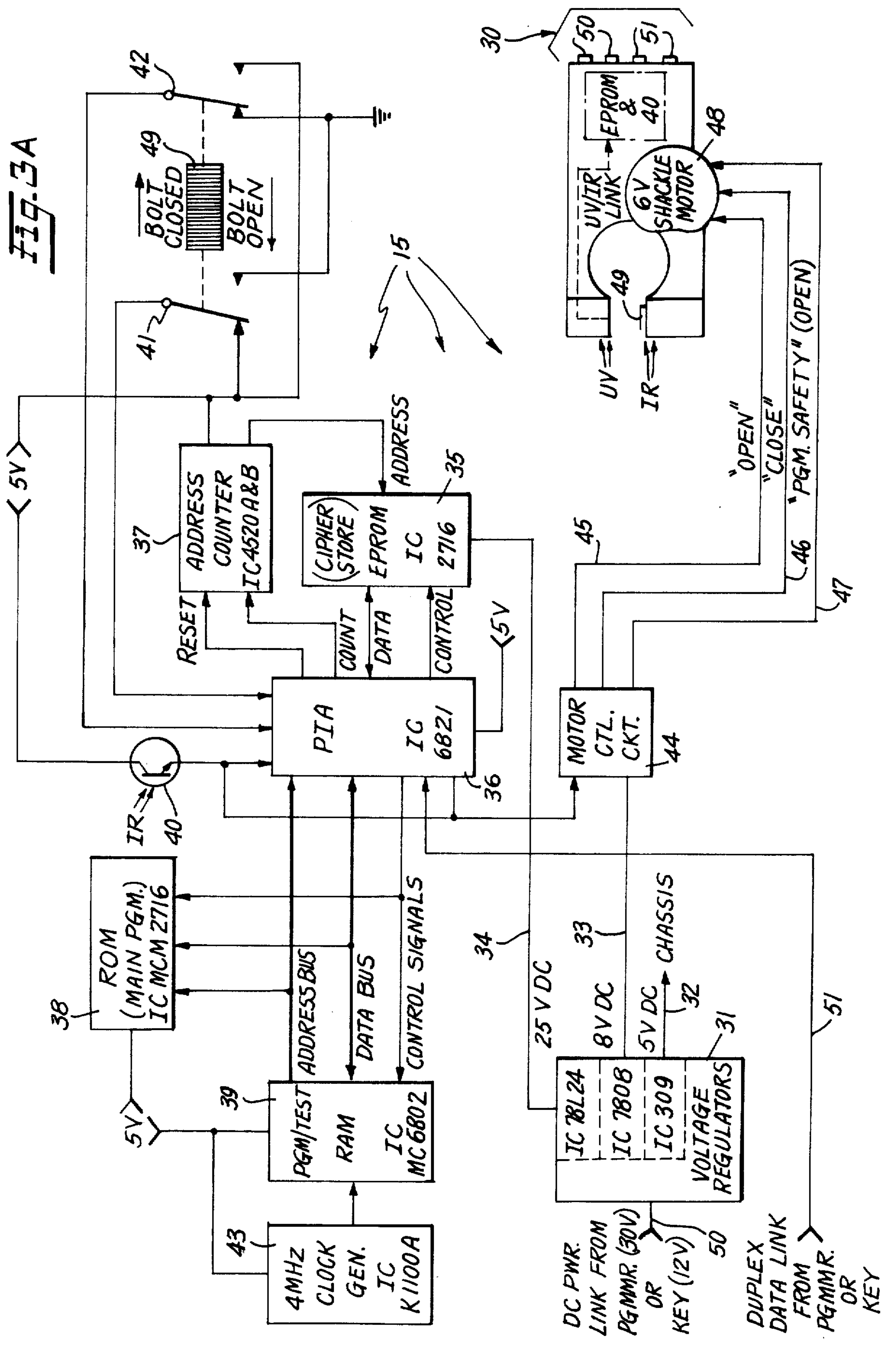
FIG. 3A is a schematic representation of a typical lock utilized in this system.

FIG. 3A is devoted exclusively to the disclosure of the functional circuitry of a typical lock 15. Upon its interconnection to the programming cradle of the master programmer 1 or a properly encoded key 13, DC power is supplied to the lock through a set of external contacts 50 whereupon a triple-gang of voltage regulators 31 supply three separate power buses 32, 33, and 34 with the appropriate respective voltages 5 vDC, 8 vDC, and 25 vDC. The latter bus 34 only carries 25 vDC when the lock 15 is hooked up to the master programmer 1 and then only when said programmer is actually encoding a cipher in the volatile memory/EPROM 35 of the lock. 8 vDc is supplied on power bus 33 at all times to the motor control circuit 44 which controls the integrated 6-volt electric motor 48 via three outputs 45, 46, and 47 which respectively transmit the commands "open", "close," and "program safety (open)." The remaining power bus 32 supplies 5 vDC to the chassis of the circuit thus feeding all positive inputs in common-tie fashion.

The second set of electrical contacts and metallic link 51 which also comprise the "keyhole" 30, is the conductor for a duplex data stream from either the master programmer 1 or a propely encoded key 13. When it is the object to erase the lock's volatile memory 35, it is possible to feed the appropriate control signals through link 51 to a peripheral interface unit (PIA) 36 which cnditions the EPROM 35 to await concomitant ultraviolet irradiation through the internal optical link 15A. Of course, it an $E^2$PROM were substituted for the volatile memory 35, erasure thereof could be performed through electrical means—without the need for UV irradiatin,—but this particular equivalent subprocedure would not be in keeping with the overall scheme of this invention. Accordingly therefore, it is preferred that in order to erase the lock's memory 35, a suitable data signal be conducted through path 51 to the PIA 36 which in turn causes the motor control circuit 44 to initiate the "program safety (open)" command on bus 47 to the 6 vDC electric motor 48 which retracts the shackle, or bolt, 49 thus uncovering the aperture to the optical link 15A by which the volatile memory 35 may be illuminated from a UV source 2 for a period around 30 minutes in duration. Positive programming/encoding of a cipher on lock's EPROM 35 necessitates that the same optical link 15A remain accessible, but in this instance, for the transmission of IR light from a source 3 which is designed to impinge upon IR phototransistor 40. The activation of IR detector 40 generates a positive signal which is fed to the PIA 36 as shown in FIG. 3A.

To assist with the processing and encoding of a cipher code into a lock's EPROM 35, a number of ordinarily available subcomponents are wired-in the circuit under the control of the PIA 36. The specific interconnection of these subelements, which include an address counter 37, a temporary memory (RAM) 39, and a 4 MHz clock generator 43, should be well understood by those skilled in simple microprocessor assembly, and thus further detailed attention will not be devoted to this matter. The plain display of these circuit elements in FIG. 3A ought is considered to be sufficient for a potential assembled of this particular lock circuit.

Still referring to FIG. 3A, the actual operation of lock 15 in cooperation with a properly encoded key 13 can easily be seen not only to involve the use of the PIA 36, the EPROM 35, the address counter 37, and the floating temporary calculation memory (RAM) 39, but also the ROM 38 which is unerasable and is the repository of the basic functional program of lock 15, including the opening and closing, response to power input, motor control, etc.

Figure 3B:
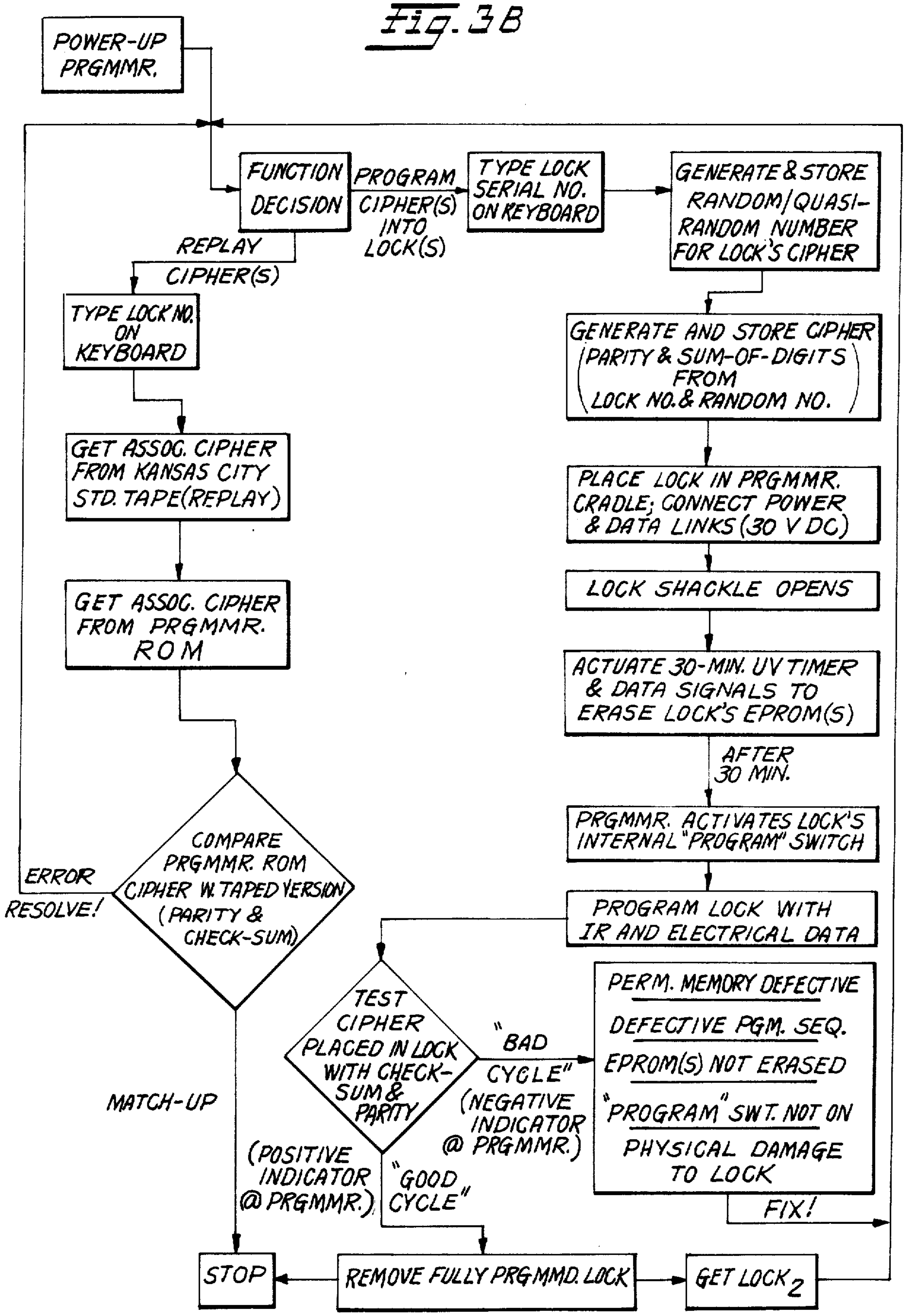
FIG. 3B is a flowchart pertaining to the cipher-encoding and memory-erasure of a lock in contact with the master programmer at the central factory.

FIG. 3B is rather self-explanatory in the manner of most flowcharts, and is devoted to the erasure and encoding/programming of a cipher into the volatile memory (EPROM) of lock 15 of this improved security system. Accordingly, each step is traced in time-sequential format using terms and references previously appearing in this specification. This chart can also serve as the basis for an algorithm of the type required by the lock 15 and the master programmer 1 pursuant to its proper functioning. One skilled in the electrical programming arts should have no major difficulties in proceeding from this layout.

Figure 3C:
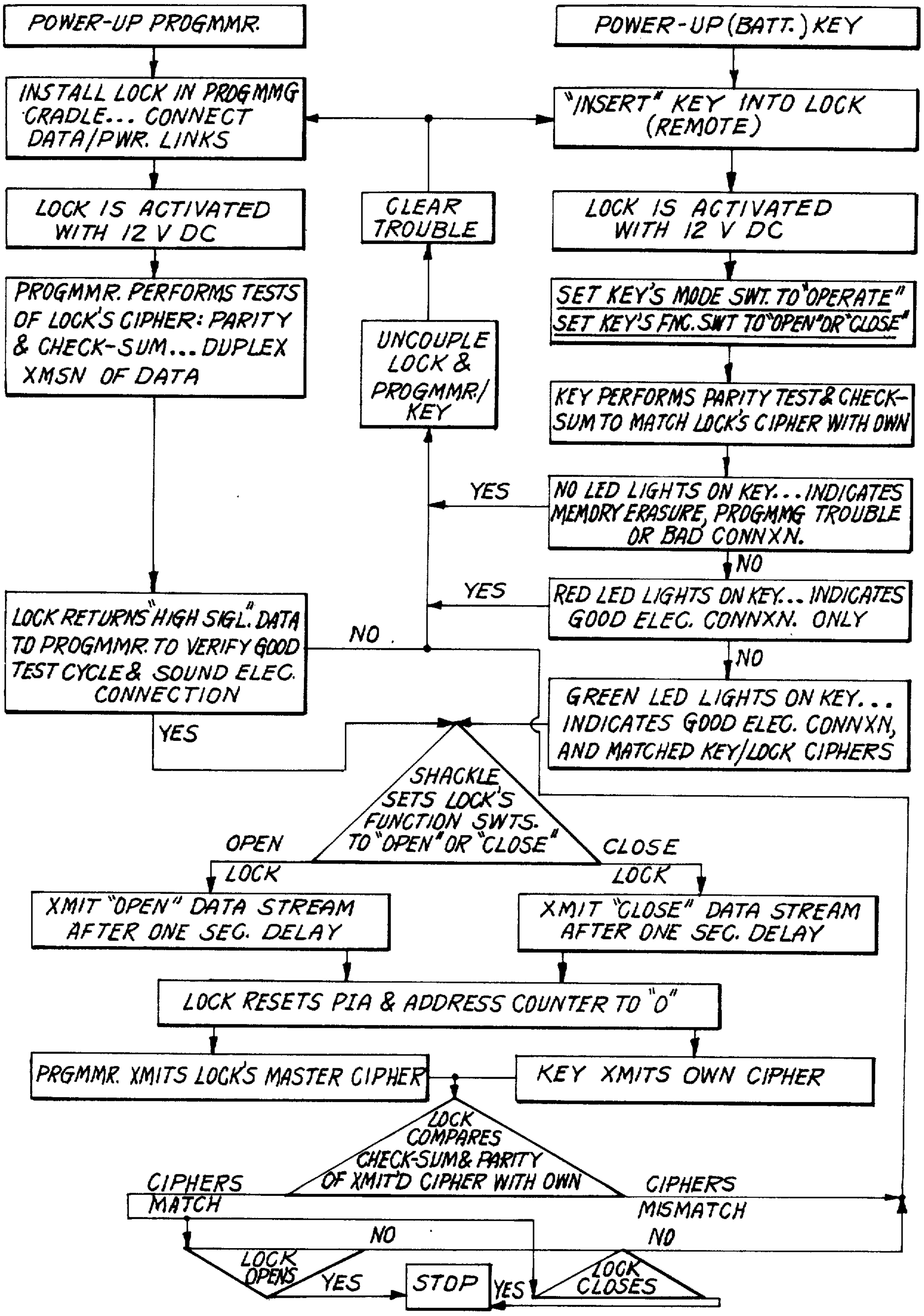
FIG. 3C is a flowchart pertaining to the actual functional operation of the lock in contact both with either the master programmer and the key.

FIG. 3C shows another flowchart—specifically directed to the operation of the lock 15 as regards its opening and closing while under the control of either the master programmer 1 or a suitably encoded key 13. This diagram can similarly serve as the basis for an algorithm to be followed by the lock's processor circuitry, especially in light of the elements revealed in FIG. 3A.

In proceeding with a disclosure and enumeration of some typical elements comprising the key 13 associated with this security system, FIG. 4A should be referred to and wherein all the pertinent subcomponents and their interrelationships are pictorially presented. As one can readily see, the key 13 contains an integrated 12 volt battery pack 61 which may consist of eight C-cells or other rechargeable species. There is connected thereto in plug-in-type manner a 13.8 vDC battery charger 60 which both floats the batteries at their peak voltage level and supports the RAM-sustaining power circuit 68 through a suitable power bus 67 and protection diode 64. There are three switches externally located on the key, one of which is switch 62 which controls basic operational power to the main circuitry via voltage regulators 63. Accordingly, a main power bus 65 conducts 5 vDC to the chassis so as to power all the circuit elements thereon. Power link 66 transmits 12 vDC to the corresponding input voltage regulator 31 of the lock 15 when connected thereto. This same power bus 66 terminates in a set of contacts along with which are joined the data link and contacts 81 to form the key's "teeth" 85 that physically interface with the "keyhole" of the lock 15.

A comparison of FIG. 4A with FIG. 3A reveals the fundamental similarity in processor circuitry between the key 13 and the lock 15 of this security system. The key 13 contains substantially the same devices interconnected in substantially the same way, including such elements as a temporary storage memory (RAM) 74, a 4 MHz clock 84, a PIA 71, a permanent, unerasable ROM 73, and address counter 72, and an erasable cipher memory 69, which in this case is a RAM, EAROM or $E^2$PROM and further whch is controlled by the quad-switch 82. Volatile memory 69 may be optionally and equivalently substituted by an unmasked EPROM. In that instance the erasure-by-UV would have to be arranged, as with the lock 15, which is not precisely in keeping with the general spirit of this invention. Regardless of which type of solid state cipher memory device is chosen, it is important to note that the memory-preserve power circuit 68 and its guard diode 70 are only necessary for maintaining the electrical state of RAM (CMOS) until such time as either the batteries 61 or charger 60 supporting cipher memory 69 through power link 67 falls below the 3-volt level; which for the 12 volt battery pack 61, is estimated to take up to 10,000 hours.

The actual operation of the key is very much intertwined with that of the lock, and its basic behavior may be seen in the appropriate places of the flowchart of FIG. 3C. Other differences from the lock's circuitry in the same operational regard include the setting of the switch 76 to "operate" and the switch 75 either to "open" or "close" in accordance with the wishes of the key's user at remote location 16. When a key 13 is properly coupled to a lock 15, and after the switches 75 and 76 are appropriately set, one should expect a certain status-indicative response from one of the two LED's 77 and 83 located on the key 13. Upon the green LED 77 lighting up, the cipher check-sum and parity check confirmed along with a sound electrical connection, the lock should respond precisely in accordance with the key's chosen function indicated by the switch 75. The red LED 83 lighting up indicates sound electrical connection but further is intended to inform the user that either the parity check or the check-sum test performed by the key through data link 81 are not satisfactory,—or specifically the key 13 is not encoded with the proper cipher and must have its volatile memory 69 reprogrammed from one of the memory tapes 5 or 8 to conform with the particular lock 15 giving the negative test results. If the key 13 is "inserted" into the lock and no LED lights up, the complete erasure of the lock's EPROM 35 or other serious damage is then indicated.

Programming/reprogramming of the key's RAM 69 can be accomplished electroacoustically as shown in FIG. 4A through the use of the input transducer (microphone) 12, an operational amplifier 78, and a suitable tone decoder 79 which feed simplexed data into the key's PIA 71 via data link 80. One skilled in the art can see that this operation, including dial-up, should take well under 10 minutes to accomplish provided that switch 76 is set to the "program" position. As mentioned above, the 2 kHz data may be obtained either from the factory-located tape facility 5 or from a shipper-located tape recorder 8.

Figure 4B:
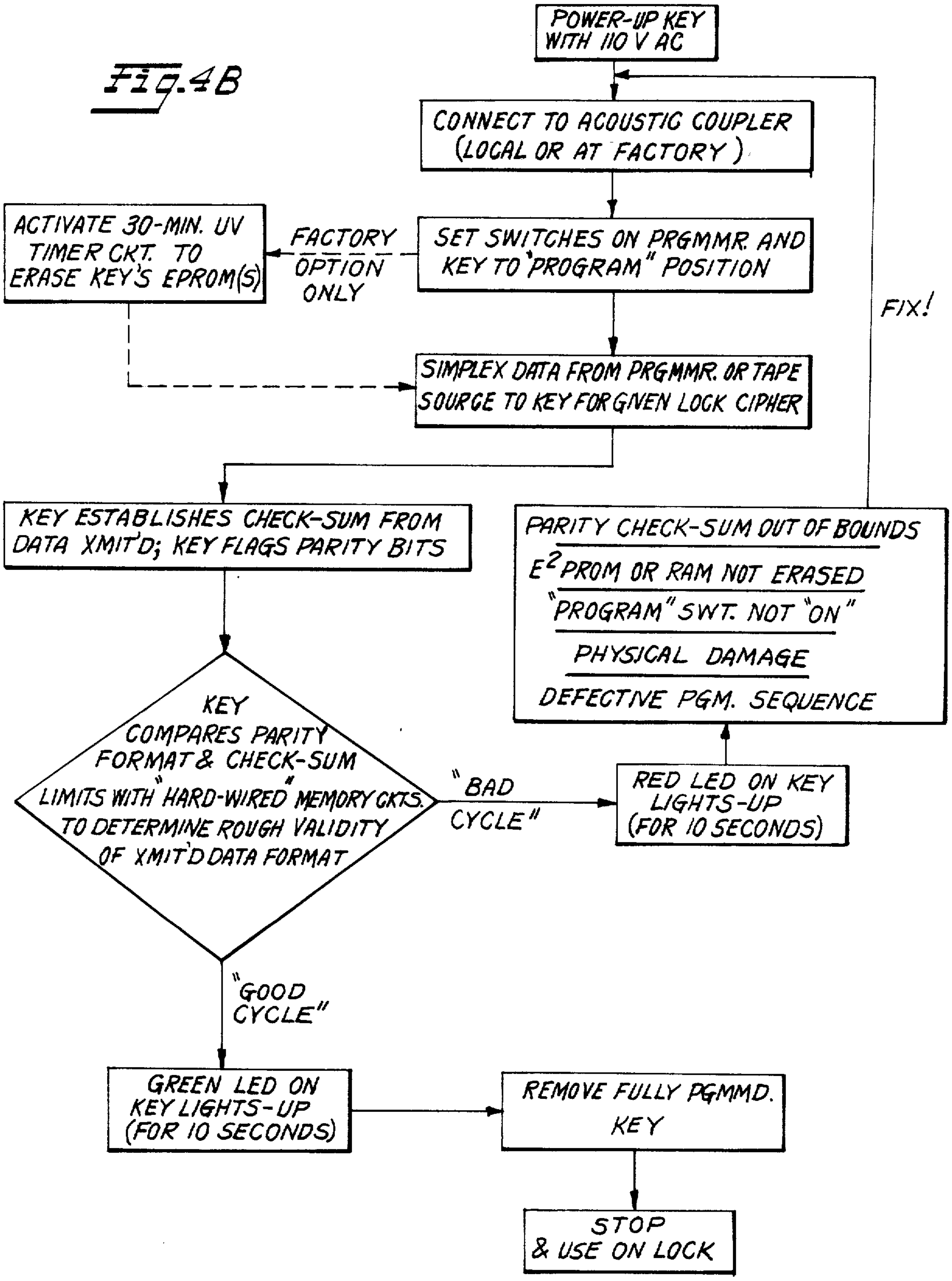
FIG. 4B is a flowchart pertaining to the (locks) cipher-encoding and memory-erasure of a key either in contact with the master programmer at the central factory or with a remote encoding means via the telephone.

FIG. 4B is a flow-chart devoted to the specific operational mechanism, supra, relating to the electroacoustical programming of a key 13. Its terms should be quite clear, and one can easily see that this procedure is not nearly as involved as is that for the lock 15 as depicted in FIG. 3B. Conspicuous by its absence is the particular need to implement either UV (except as an option) or IR radiation for the purposes of erasing or programming key 13, although other arrangements are permissible within the scope of this invention.

It is understood by those skilled in the art that the invention can be practiced other than as explicitly descrobed above without departing from the scope and intent of the invention. Accordingly, the scope and intent of the invention is thus to be interpreted solely in light of the appended claims.

What is claimed is:

1. An improved security system for use in mobile commerce consisting of an electromechanical lock and electronic key and an integrated program-erase procedure whereby overall systemic complexity and security are increased through the use of electromagnetic wavelengths to erase and reprogram volatile lock memories, comprising:

a computing means located at a first location for programming said lock means and said key means using a first electromagnetic radiating means for programming said lock means with a cipher code and using accoustical wave generating means for programming said key means with a corresponding cipher code;

said computing means also having a second electromagnetic radiating means for erasing said lock means cipher code;

a reprogrammable key means having an accoustical wave receiving microphone and electronic memory storing means for receiving and storing cipher data from the computing means to operate said lock means; and an accoustical speaker means located at said first location and connected to said computing means for communicating with said microphone on said key means when said key means is at a second location remote from said first location wherein said key means can be programmed to operate said lock means when said lock means is located at said second location and wherein the cipher code can be changed by the computing means only at said first location.

2. The security system of claim 1 wherein said first and second electromagnetic radiating means operate at frequencies that are in the invisible spectrum.

3. The security system of claim 2 wherein said spectrum is infrared for said first electromagnetic radiating means and ultraviolet for said second electromagnetic radiating means.

4. The security system of claim 1 wherein both said key means and said lock means have a permanent and volatile memory capability.

5. The security system of claim 4 wherein said permanent memory is a ROM-type and said volatile memory is an EPROM type.

6. The security system of claim 1 wherein said key means and said lock means are portable.

7. The security system of claim 6 wherein there are a plurality of individual key means and a plurality of individual lock means.

8. The security system of claim 7 wherein each of said plurality of individual lock means has a different cipher code.

* * * * *